United States Patent [19]

Flowerday

[11] Patent Number: 4,783,037
[45] Date of Patent: Nov. 8, 1988

[54] CONTAINER HOLDER FOR A VEHICLE
[75] Inventor: Carl W. Flowerday, Holland, Mich.
[73] Assignee: Prince Corporation, Holland, Mich.
[21] Appl. No.: 83,156
[22] Filed: Aug. 10, 1987
[51] Int. Cl.$^4$ .............................................. A47K 1/09
[52] U.S. Cl. ............................ 248/311.2; 248/316.5; 297/194
[58] Field of Search ................. 248/311.2, 313, 316.5; 297/194, 188; 211/71, 74

[56] References Cited

U.S. PATENT DOCUMENTS

| | | | |
|---|---|---|---|
| 1,760,592 | 5/1930 | Gift | 248/316.5 X |
| 1,895,156 | 1/1933 | Fisher | 248/316.5 |
| 2,058,102 | 10/1936 | Phillip | 248/316.5 X |
| 2,579,878 | 12/1951 | Stone | 248/313 |
| 4,645,157 | 2/1987 | Parker | 248/311.2 |

*Primary Examiner*—Ramon S. Britts
*Assistant Examiner*—David L. Talbott
*Attorney, Agent, or Firm*—Price, Heneveld, Cooper, DeWitt & Litton

[57] ABSTRACT

A container holder includes a vehicle armrest having a generally horizontally extending recess opening at the front for receiving a slide member defining a support floor for containers. Pivotally mounted to the slide member are a pair of arms which define sidewalls for selectively supporting sides of a container positioned on the slide floor. The slide member is slidably supported within the recess of the vehicle support member for movement between a fully retracted and concealed stored position and selected extended positions permitted the arms, which are biased to move away from each other, to span different diameter containers.

23 Claims, 3 Drawing Sheets

CONTAINER HOLDER FOR A VEHICLE

BACKGROUND OF THE INVENTION

The present invention relates to a container holder and one particularly adapted for supporting different sized containers in a vehicle.

A container holder such as a cupholder has become a popular vehicle accessory which can be conveniently located to provide the driver or passenger a support for holding a beverage container. Such cupholders have been proposed for mounting within an armrest such that they can be stored when not in use and extended from the armrest for use. U.S. Pat. No. 4,417,764 discloses such a cupholder system. Additionally, U.S. patent applications entitled "BEVERAGE CONTAINER HOLDER FOR VEHICLES", Ser. No. 725,831 filed on Apr. 18, 1985, and "CONTAINER HOLDER FOR A VEHICLE", Ser. No. 944,989 filed on Dec. 22, 1986, both assigned to the present assignee, disclose container holders which are adjustable and also can be mounted within the armrest of a vehicle.

SUMMARY OF THE PRESENT INVENTION

The container holder of the present invention represents a unique structure for use within an armrest or other support member of a vehicle and one which has multiple positions for receiving and supporting different sized containers such as cups, cans and the like. The construction is relatively uncomplicated utilizing relatively few moving parts and therefore is inexpensive to construct and yet provides an attractive system which can be retracted within the vehicle support member when not in use or variably extended for providing a support for different sized containers.

Apparatus embodying the present invention includes a vehicle support member having a generally horizontally extending recess opening along one edge for receiving a slide member defining in part the floor of the container holder of the present invention. Pivotally mounted to the slide member are a pair of arms which define sidewalls for selectively supporting sides of a container positioned on the slide floor. The slide member is slidably supported within the recess of the vehicle support member for movement between a fully retracted and concealed stored position and selected extended positions permitting the arms which are biased to move away from each other, to span different diameter containers.

In a preferred embodiment of the present invention, stop means are provided for selectively holding the slide means at selected locations corresponding to standard container holder dimensions. In the preferred embodiment of the invention also, a forward end wall is provided for enclosing the recess opening when the slide member is in a fully retracted position and also for supporting a container. These and other objects, features and advantages of the present invention will become apparent upon reading the following description thereof together with reference to the accompanying drawings in which:

DETAILED DESCRIPTION OF THE PREFERRED EMBODIMENT

Figure 1:
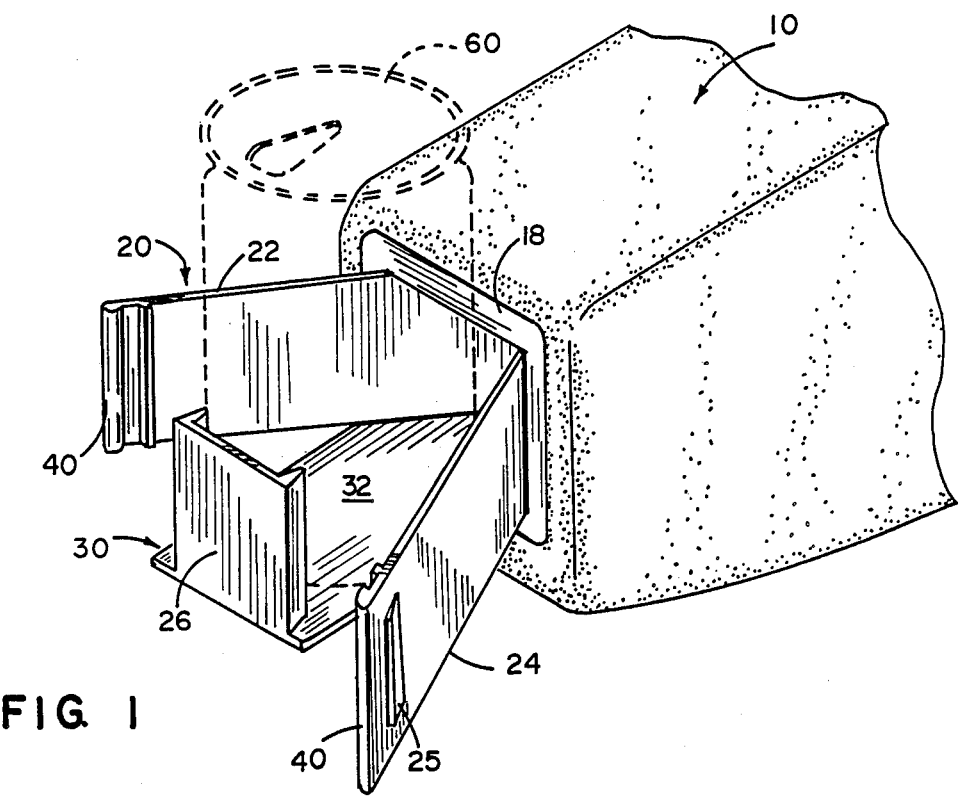
FIG. 1 is a fragmentary perspective view of an armrest incorporating the container holder of the present invention which is shown in a first use position.
Figure 2:
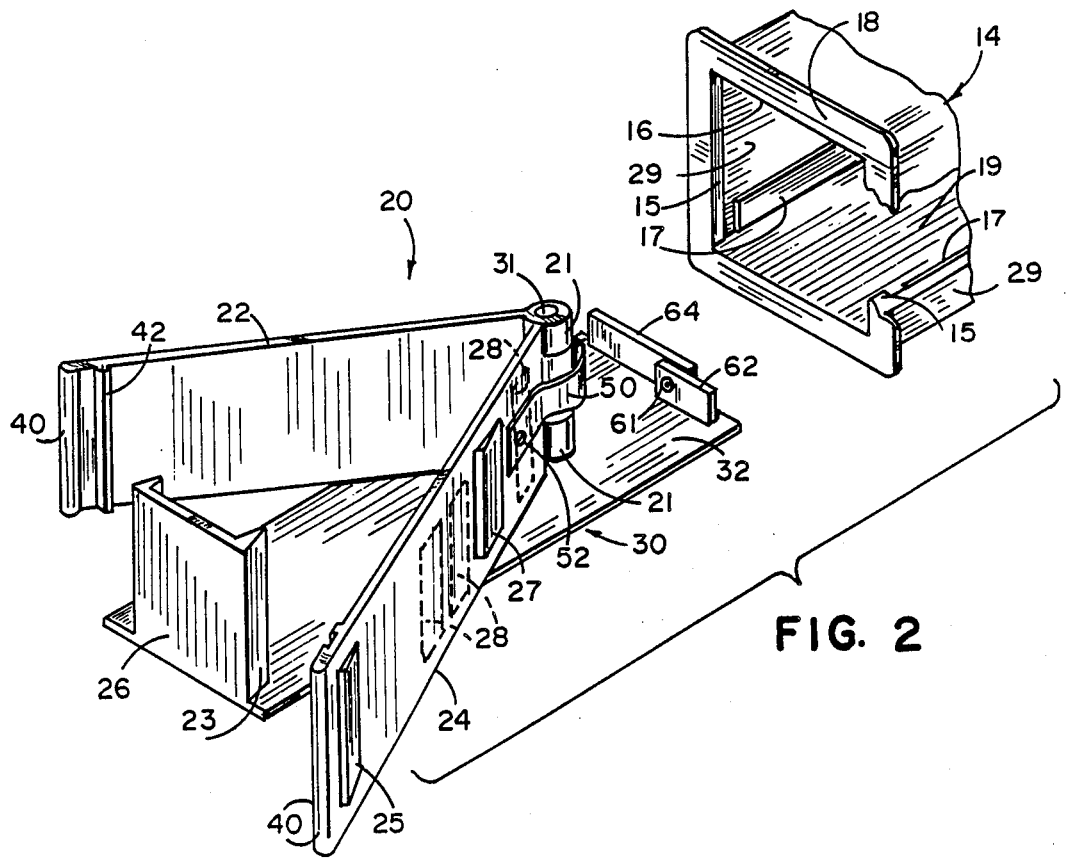
FIG. 2 is a fragmentary perspective and exploded view of the container holder of the present invention.
Figure 3:
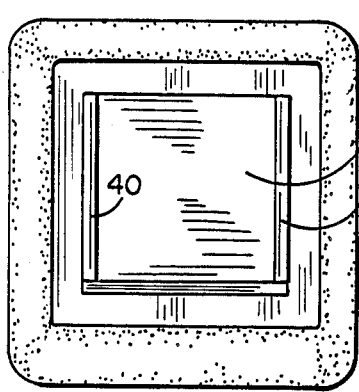
FIG. 3 is a front elevational view of the armrest of FIG. 1, with the container holder shown in a fully retracted position.

Referring initially to FIG. 1 there is shown vehicle support member such as an armrest 10 which is mounted within the vehicle typically between the front seats of an automobile. The armrest includes a front-opening storage recess 12 (FIGS. 4–7) formed therein and having a generally elongated rectangular shape for receiving a container holder 20. Fitted within the recess 12 is a slide support member such as sleeve 14 (FIGS. 2, 4–7) having a front extending opening 16 trimmed by a peripheral flange 18, as best seen in FIGS. 1–3. The sleeve 14 includes an inner vertically extending ledge 15 on either side which as described below in connection with FIGS. 5 and 6, serve as a latch for holding the container supporting slide member in a predetermined position with respect to the armrest 10. Sleeve 14 also includes a pair of guide rails 17 mounted to opposite sidewalls 29 of the rectangular member spaced near but above the floor 19 thereof for holding the slide member 30 in position as described below.

The container holder 20 of the present invention includes a slide member 30 which slidably extends within the slide support member 14, a pair of arms 22 and 24 pivotally coupled to the floor 32 of slide member 30, a forward end wall 26 extending upwardly from the leading edge of floor 32 and first and second latch means 25 and 27 on each of the arms 22 and 24.

Figure 5:
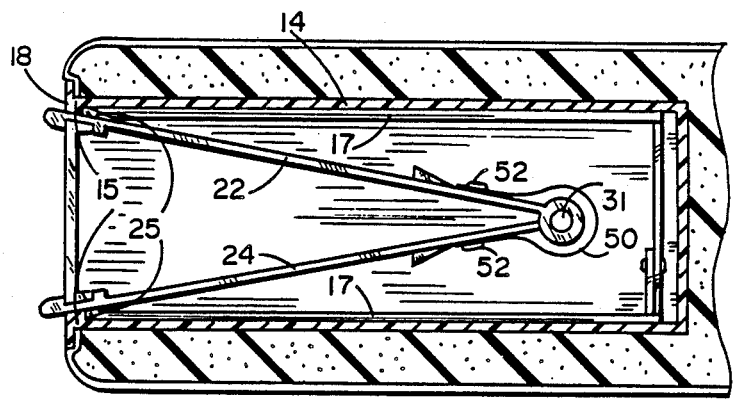
FIG. 5 is a fragmentary horizontal cross-sectional view of the armrest and container holder shown in FIG. 4.

Each of the arms 22 are generally rectangular and include at their forward edge inwardly projecting vertically extending spaced integrally formed bars 40 and 42 (FIGS. 1 and 2) which span the inwardly tapered edges 23 of end wall 26 as best seen in FIG. 5 for providing stabilizing the unit when in the closed lateral position and with bars 40 extending outwardly a sufficient distance to define handles which, as described below, can be compressed toward one another for unlatching the container support member 20 for withdrawal from the armrest 10.

The arms 22 and 24 are pivotally mounted to slide floor 32 by means of interdigitated support collars with arm 22 including a pair of spaced collars 21 and arm 24 including a single such collar 29' extending between collars 21 with a pivot pin 31 extending downwardly through the collars and supported on the floor 32 of slide member 30. A bias spring 50 extends around the rear side of collar 29 and is generally U-shaped in configuration and is secured to each of the arms 22 and 24 by fastening means such as a screw 52 or the like. Spring 50 is in compression so as to tend to spread the arms 22 and 24 outwardly away from each other as the slide is withdrawn from the armrest as illustrated in FIG. 2.

Figure 4:
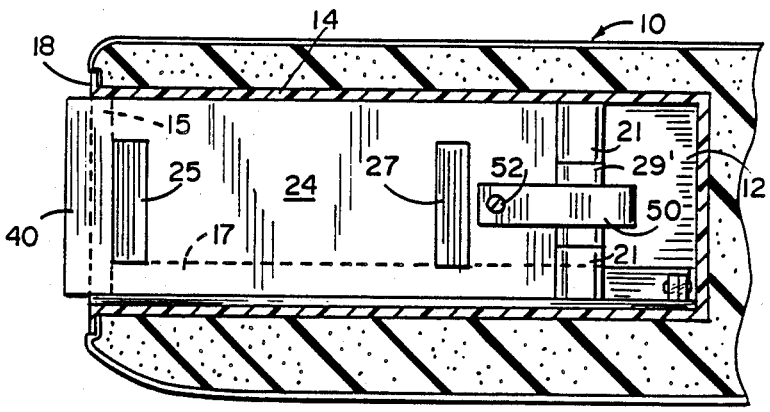
FIG. 4 is a fragmentary vertical cross-sectional view of the armrest and container holder shown in FIG. 3.
Figure 6:
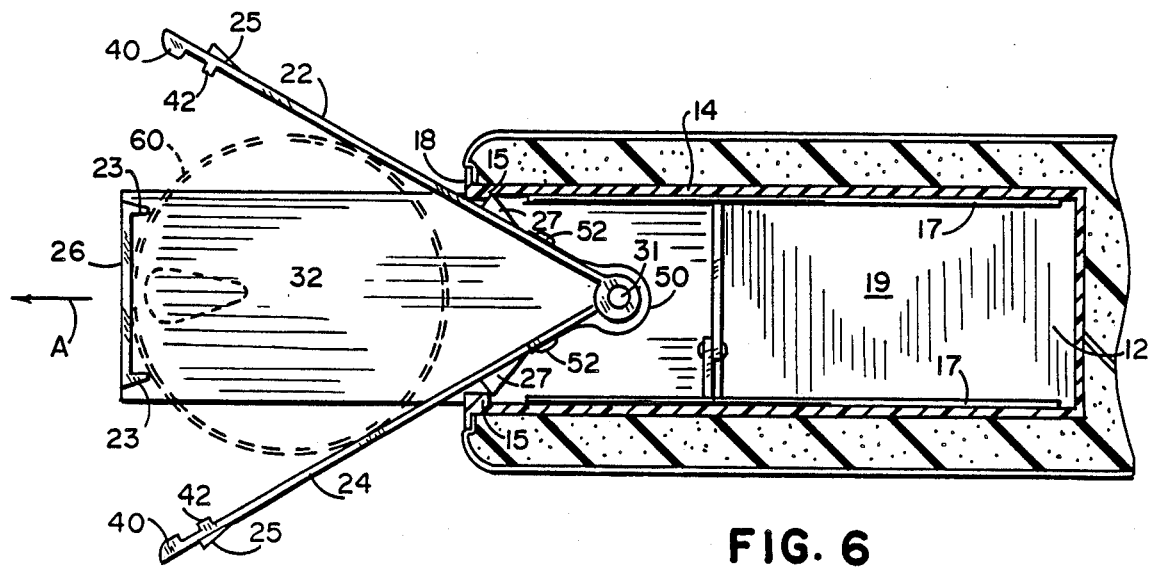
FIG. 6 is a fragmentary horizontal cross-sectional view of the armrest and container holder shown in the same position as illustrated in FIG. 1.

Each of the arms 22 and 24 include a first integral triangular stop means 25 near the forward end of the arms for holding the slide member in a stored retracted position as shown in FIGS. 3-5 with the stop members 25 engaging the ledges 15 to hold the container holder in the retracted position with spring 50 urging the arms outwardly against sidewalls 29 to the latched position as best illustrated in FIG. 5. In order to withdraw the container holder, it is necessary to squeeze the handles 40 together slightly which allows the latch defined by members 25 and 1 to unlatch. The outwardly biased arms urge against the sidewalls 29 of sleeve 14 and automatically force the slide 30 outwardly from the armrest in a direction indicated by arrow A in FIG. 6. A first use position is reached when a pair of second triangular latch members 27 engage ledges 15 as shown in FIG. 6. In this position, the arms are spread a first distance as illustrated in FIGS. 1 and 6 to define a triangle with first wall 26 with the triangle having a dimension corresponding to a standard beverage container size such as a can 60 shown in phantom form in FIGS. 1 and 6.

Figure 7:
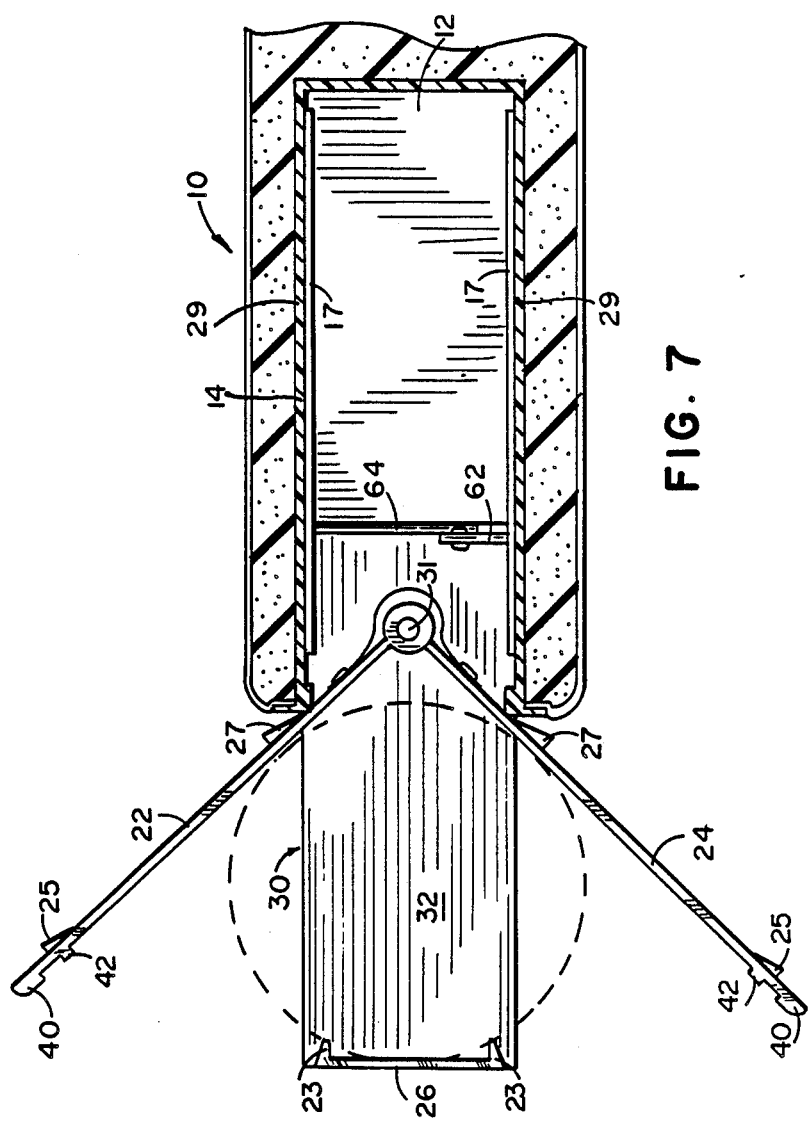
FIG. 7 is a fragmentary horizontal cross-sectional view of the armrest and container holder of the present invention shown in a second use position.

If it is desired to extend the slide member 30 further from the armrest 10 thereby allowing arm 22 and 24 to spread even further apart the arms are compressed inwardly slightly toward one another to allow latch members 27 to clear ledges 15 and the slide 30 withdrawn from recess 12 until the desired opening size is reached, as illustrated in FIG. 7, in which position the arms are spread sufficiently to allow a second beverage container 70 such as a cup having a larger diameter than can 60 to be supported on the floor 32 of the container holder. If desired, plurality of latches such as 25 and 27 can be placed in spaced relationship along the outer surface of each of the legs 22 and 24 as shown in phantom schematic form at 28 in FIG. 2 to provide an incrementally adjustable pair of support arms 22 and 24 which straddle the sidewalls of the containers for supporting them. The containers are likewise supported by the inwardly projecting edges 23 of front wall 26 to nest the container between the arms 22 and 24 the front wall 26 to prevent tipping of the container during movement of the vehicle.

A rear stop member 62 is mounted near the rear edge of floor 32 and engages one ledge 15 to prevent inadvertent withdrawal of the slide. The stop member 62 shown in FIG. 2 is mounted to a stub wall 64 extending upwardly from the rear edge of slide floor 32 by a pivot pin 61 which allows the slide member to be inserted within the slide support 14 with the stop 62 pivoted in a direction rotated 90 degrees counter clockwise from that illustrated in FIG. 2 until the stop clears ledge 15 after which it is positioned downwardly as illustrated. The lower edge of guides 17 extend over the outer edges of slide floor 32 to provide support for the floor 32 to prevent tipping of the slide 30 during use. Members 17 are spaced rearwardly to provide a gap behind ledges 15 sufficient to allow the latch members on the arms 22 and 24 to effectively latch the cupholder in different positions as shown in FIGS. 5 and 6. Sleeve 14, arms 22 and 24 and slide 30 can be injected molded of a suitable polymeric material such as ABS.

It will become apparent to those skilled in the art that various modifications to the preferred embodiment of the invention described herein can be made without departing from the spirit or scope thereof as defined by the appended claims.

The embodiments of the present invention in which an exclusive property or privilege is claimed are as follows:

1. An adjustable container holder for a vehicle comprising:
   a support member for slidably receiving a slide member;
   a slide member defining in part a floor for supporting a container thereon;
   a pair of arms which define sidewalls for selectively supporting sides of different sized containers, said arms pivotally mounted on said slide member; and
   spring bias means coupled to said arms for urging them away from each other such that as said slide member is progressively extended from said support member said arms progressively spread apart for supporting the sides of progressively larger containers.

2. The apparatus as defined in claim 1 wherein said support member includes sleeve means for slidably receiving said slide member, said sleeve means including sidewalls having guide means for supporting said slide member.

3. The apparatus as defined in claim 2 wherein said arms engage said sleeve means to urge said slide member from said sleeve.

4. The apparatus as defined in claim 3 wherein said arms include latch means for holding said slide member in a predetermined position with respect to said sleeve means.

5. The apparatus as defined in claim 4 wherein said arms are pivotally mounted at one of their ends to said slide member and said bias means comprises a generally U-shaped spring extending over said one end of said arms.

6. The apparatus as defined in claim 5 wherein said slide member includes a forward wall for engaging a side of a container.

7. The apparatus as defined in claim 6 wherein said slide member includes stop means engaging said sleeve means for preventing said slide member from being withdrawn from said sleeve means.

8. A container holder for mounting within a recess formed in a vehicle armrest comprising:
   an elongated floor for supporting a container thereon, said floor including an upstanding wall at one end for supporting a side of a container;
   a pair of arms pivotally coupled at one end to said floor at a location spaced from said upstanding wall to define an adjustable triangular support area for containers;
   bias means coupled to said arms for urging them apart; and
   means for slidably mounting said floor to the vehicle armrest such that it can be moved between a retracted position in the armrest and is urged outwardly by said arms to at least one extended use position wherein said arms open as said floor is extended from the armrest.

9. The apparatus as defined in claim 8 wherein said means for mounting said floor to the armrest includes sleeve means for slidably receiving said floor, said sleeve means including sidewalls having guide means for supporting said floor.

10. The apparatus as defined in claim 9 wherein said arms engage said sleeve means to urge said floor from said sleeve.

11. The apparatus as defined in claim 10 wherein said arms include latch means for holding said floor in a predetermined position with respect to said sleeve means.

12. The apparatus as defined in claim 11 wherein said arms are pivotally mounted at one of their ends to said floor and said bias means comprises a generally U-shaped spring extending over said one end of said arms.

13. The apparatus as defined in claim 12 wherein said floor includes stop means engaging said sleeve means for preventing said slide member from being withdrawn from said sleeve means.

14. A vehicle armrest and container holder comprising:
   an armrest for mounting to a vehicle, said armrest including an opening extending therein for receiving a container holder;
   slide means and means slidably supporting said slide means within said opening of said armrest;
   a pair of arms pivotally coupled to said slide means to define a support for containers when said slide means is extended from said armrest; and
   spring bias means coupled to said arms for urging them apart, and wherein as said arms open, said slide means is extended from the armrest to at least one use position for engaging and supporting a container between said arms.

15. The apparatus as defined in claim 14 wherein said slide means includes a generally longitudinally extending floor and wherein said arms are pivotally coupled to the upper surface of said floor.

16. The apparatus as defined in claim 15 and further including sleeve means extending into said armrest opening, said sleeve means including sidewalls biasing guide means supporting said floor.

17. The apparatus as defined in claim 16 wherein said arms engage said sleeve means to urge said slide means from said armrest.

18. The apparatus as defined in claim 17 wherein said arms include latch means for holding said floor in a predetermined position with respect to said sleeve means.

19. The apparatus as defined in claim 18 wherein said arms are pivotally mounted at one of their ends to said floor and said bias means comprises a generally U-shaped spring extending over said one end of said arms.

20. The apparatus as defined in claim 19 wherein said floor includes stop means engaging said sleeve means for preventing said slide member from being withdrawn from said sleeve means.

21. A container holder comprising:
   a support housing with an opening for slidably receiving a slide member;
   a slide member defining in part a horizontally extending floor for supporting a container thereon;
   a pair of arms which define vertically extending planar sidewalls each having an inner surface for selectively supporting sides of a container and an outer surface engaging edges of said opening, said arms pivotally mounted at one end to a center portion of said slide member;
   bias means coupled to said arms for urging them away from each other such that as said slide member extends from said support housing, said arms open to at least one container supporting position; and
   first stop means for holding said slide at said at least one container supporting position.

22. The apparatus as defined in claim 21 wherein said arms engage said edges to urge said slide member from said housing.

23. The apparatus as defined in claim 22 and further including second stop means for holding said slide at a second container supporting position extended further from said housing than said at least one container supporting position for supporting a larger diameter container.

* * * * *